United States Patent
Kochura et al.

(10) Patent No.: US 11,308,287 B1
(45) Date of Patent: Apr. 19, 2022

(54) BACKGROUND CONVERSATION ANALYSIS FOR PROVIDING A REAL-TIME FEEDBACK

(71) Applicant: INTERNATIONAL BUSINESS MACHINES CORPORATION, Armonk, NY (US)

(72) Inventors: Nadiya Kochura, Bolton, MA (US); Jonathan D. Dunne, Dungarvan (IE); Fang Lu, Billerica, MA (US)

(73) Assignee: International Business Machines Corporation, Armonk, NY (US)

(*) Notice: Subject to any disclaimer, the term of this patent is extended or adjusted under 35 U.S.C. 154(b) by 85 days.

(21) Appl. No.: 16/948,807

(22) Filed: Oct. 1, 2020

(51) Int. Cl.
  G06F 40/56 (2020.01)
  G06F 40/35 (2020.01)
  G06F 40/289 (2020.01)

(52) U.S. Cl.
  CPC .......... G06F 40/56 (2020.01); G06F 40/289 (2020.01); G06F 40/35 (2020.01)

(58) Field of Classification Search
  CPC ......... G06F 40/56; G06F 40/289; G06F 40/35
  USPC .......................................................... 704/9
  See application file for complete search history.

(56) References Cited

U.S. PATENT DOCUMENTS

| | | | | |
|---|---|---|---|---|
| 6,021,403 A * | 2/2000 | Horvitz | ................... | G06F 9/453 706/45 |
| 7,346,846 B2 * | 3/2008 | Rossi, Jr. | ................ | G06F 9/453 715/810 |
| 8,566,096 B2 * | 10/2013 | Bangalore | ............... | G06F 40/30 704/251 |
| 9,756,003 B2 * | 9/2017 | Bastide | .................... | H04L 51/12 |
| 9,887,891 B2 * | 2/2018 | Abou Mahmoud | .... | H04L 67/22 |
| 10,031,901 B2 * | 7/2018 | Chakra | .................. | G06F 16/345 |
| 10,116,607 B2 * | 10/2018 | Akavaram | ............. | G06F 16/35 |
| 10,425,364 B2 * | 9/2019 | Bastide | ................... | H04L 51/02 |
| 10,778,630 B1 * | 9/2020 | Fox | ...................... | H04L 12/1813 |
| 2006/0122850 A1 * | 6/2006 | Ward | ................... | G06Q 20/386 705/64 |
| 2008/0172612 A1 * | 7/2008 | Allen | ...................... | G06F 9/453 715/708 |
| 2009/0183096 A1 * | 7/2009 | Edelen | ................. | G06Q 10/107 715/764 |
| 2010/0030769 A1 * | 2/2010 | Cao | ....................... | G06F 16/338 707/738 |
| 2011/0231499 A1 * | 9/2011 | Stovicek | ................. | H04L 51/16 709/206 |

(Continued)

FOREIGN PATENT DOCUMENTS

| | | |
|---|---|---|
| EP | 1742174 A2 | 1/2007 |
| EP | 2610724 A1 | 7/2013 |

OTHER PUBLICATIONS

Mell, et al., "The NIST Definition of Cloud Computing", National Institute of Standards and Technology, Special Publication 800-145, Sep. 2011, 7 pages.

*Primary Examiner* — Edwin S Leland, III
(74) *Attorney, Agent, or Firm* — Dmitry Paskalov

(57) ABSTRACT

A computing device that receives a real-time chat discourse. The computing device analyses the real-time chat discourse by consecutively applying a topic analysis technique, a corpus linguistics technique and a cosine similarity technique. The computing device derives a discourse decision forking component (DDFC) based on comparing the analyzed real-time chat discourse to a similarity threshold value and determines one or more discourse forks using the DDFC.

20 Claims, 8 Drawing Sheets

(56) References Cited

U.S. PATENT DOCUMENTS

| | | | |
|---|---|---|---|
| 2013/0167025 A1* | 6/2013 | Path | G06F 9/453 |
| | | | 715/706 |
| 2014/0245178 A1* | 8/2014 | Smith | H04L 51/16 |
| | | | 715/753 |
| 2015/0347919 A1* | 12/2015 | Bastide | H04L 51/16 |
| | | | 706/52 |
| 2018/0165604 A1* | 6/2018 | Minkin | G06N 5/022 |
| 2018/0316637 A1* | 11/2018 | Desjardins | H04L 51/16 |
| 2019/0297035 A1* | 9/2019 | Fox | G06Q 50/01 |
| 2020/0167417 A1* | 5/2020 | Li | G06F 40/169 |
| 2020/0394737 A1* | 12/2020 | Storey | G16H 10/20 |
| 2021/0232632 A1* | 7/2021 | Howard | G02B 30/52 |

\* cited by examiner

BACKGROUND CONVERSATION ANALYSIS FOR PROVIDING A REAL-TIME FEEDBACK

BACKGROUND

The present invention relates, generally, to the field of computing, and more particularly to a natural language processing (NLP) of a conversation to provide a real-time feedback.

Natural language processing (NLP) is a subfield of computer science that deals with linguistics, information engineering, and artificial intelligence in order to provide interactions between computers and humans, typically in natural languages. Furthermore, NLP establishes approaches as to programming and designing computers in order to process and analyze large amounts of natural language data.

SUMMARY

According to one embodiment, a method, computer system, and computer program product for providing a real-time feedback is provided. The present invention may include a computing device that receives a real-time chat discourse. The computing device analyses the real-time chat discourse by consecutively applying a topic analysis technique, a corpus linguistics technique and a cosine similarity technique. The computing device derives a discourse decision forking component (DDFC) based on comparing the analyzed real-time chat discourse to a similarity threshold value and determines one or more discourse forks using the DDFC.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
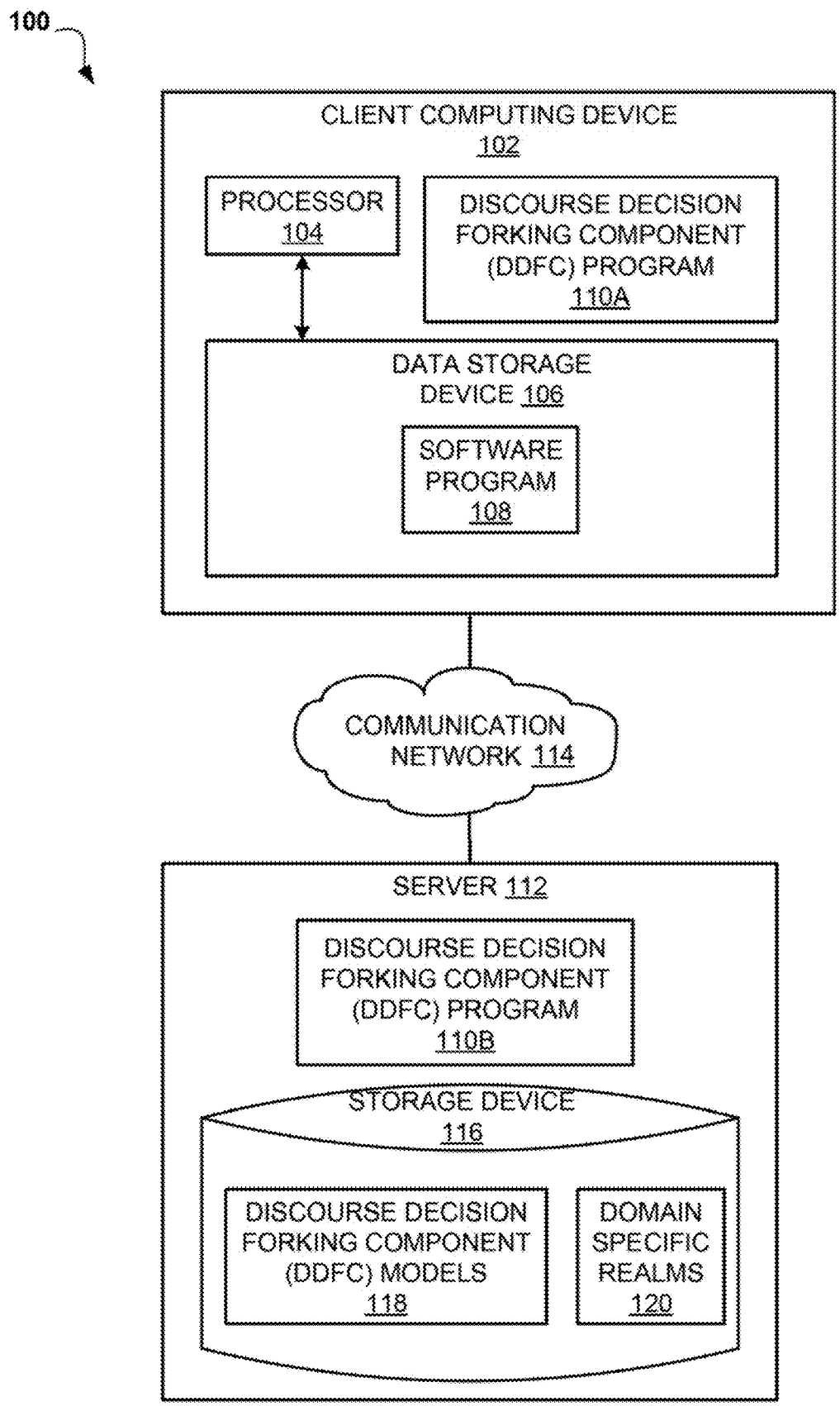
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a natural language processing (NLP) of a conversation to provide a real-time feedback. The following described exemplary embodiments provide a system, method, and program product to, among other things, analyze the conversation using topic analysis, corpus linguistics. and a cosine similarity. This analysis enables a determination of a decision forking component and further allows to display the probability of discourse forking to the user. Therefore, the present embodiment has the capacity to improve the technical field of natural language processing by applying analysis and determining forking in the conversation and providing guidance to the user as to what topics are forking or may be applied automatically to control a real time conversation without a user intervention.

As previously described, NLP is a subfield of computer science that deals with linguistics, information engineering, and artificial intelligence in order to provide interactions between computers and humans, typically in natural languages. Furthermore, NLP establishes approaches as to programming and designing computers in order to process and analyze large amounts of natural language data.

Frequently, when a user talks on the phone, chat, or during a web meeting the user is required to make some decisions. Sometimes, the user is required to make a decision in real-time during a conversation without relevant feedbacks or details, or when the user inadvertently missed the details. For example, during a spam call a user may mistakenly provide private data or agree to purchase an unneeded product. As such, it may be advantageous to, among other things, implement a system that analyses the conversation in the background and provides real-time feedback in the form of a forked discourse indicator or, alternatively, provides a response to control the conversation. For example, the system may monitor the conversation and determine where the gaps are in order to assist the user to continue the conversation.

According to one embodiment, a computer system may analyze a chat discourse using a combination of NLP techniques that derive and perform multi-vector analysis. Then, the system may derive a discourse decision forking component (DDFC). Afterwards, the system may use the DDFC to indicate the discourse forks and provide a guiderail for multi-forked responses. In addition, the system may use a domain specific realm such as finance, medical, cloud outages remediation, etc. In another embodiment, the system may analyze the context data of the current discourse and identify the optimal channel (format and media) for the forked branch such as using chatroom, audio stream, phone call, messaging, video stream. In a further embodiment, the system may analyze the social actions or intent bound to the current discourse and apply that analysis for the generation the forked hints for the user. For example, during the patient-doctor consultation the patient intents are bound up with reasons for the patient's visit, history taking, and conducting an examination, etc. In this case, the system may derive forked hints and indicate questions that can be asked by co-visiting family members.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine and analyze topics during real-time chat discourse and determine possible forking in topics thus allowing automatic control of the conversation or allowing the user to ask corresponding questions related to forking of the topics.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a Decision Discourse Forking Component (DDFC) program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components 602a and external components 604a, respectively.

The server computer 112 may be a laptop computer, netbook computer, personal computer (PC), a desktop computer, or any programmable electronic device or any network of programmable electronic devices capable of hosting and running a DDFC program 110B and a device 116 having DDFC models 118 and domain specific realms 120 and communicating with the client computing device 102 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The DDFC models 118 may be a database that stores similarity threshold values used for determining forking during the chat discourse. Domain specific realms 120 may be a database having corpus linguistic components tailored for different domains of the conversation. For example, domain specific realms 120 may have a corpus linguistic component for medical, finance, cloud outages remediation and other domains.

According to the present embodiment, the DDFC program 110A, 110B may be a program capable of analyzing and determining forking in a conversation based on analyzing topics of the conversation using a DDFC method. The DDFC method is explained in further detail below with respect to FIG. 2.

Figure 2:
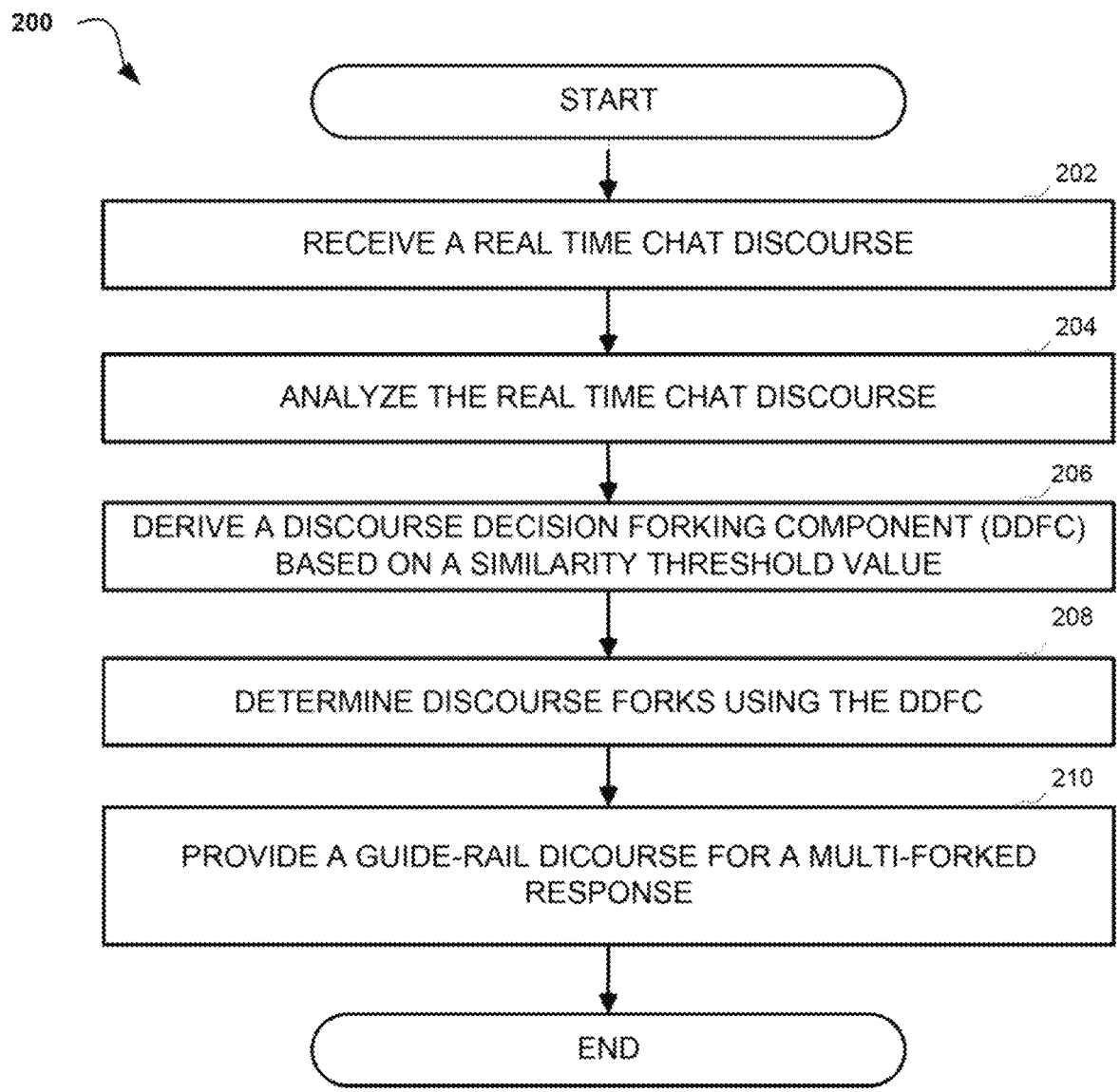
FIG. 2 is an operational flowchart illustrating a discourse decision forking component (DDFC) process according to at least one embodiment.

Referring now to FIG. 2, an operational flowchart illustrating a DDFC process 200 is depicted according to at least one embodiment. At 202, the DDFC program 110A, 110B receives a real-time chat discourse. According to an example embodiment, DDFC program 110A, 110B may receive the real-time chat discourse by either accessing the text messages from a chat program or converting a voice into a text using a voice-to-text technique. For example, the DDFC program 110A, 110B may use an application programming interface (API) of a chat program in order to access a real-time text message exchanged between the users in a chat room. In case of a phone conversation, the DDFC program 110A, 110B may apply speech recognition software to transcribe the conversation into text messages.

Figure 4:
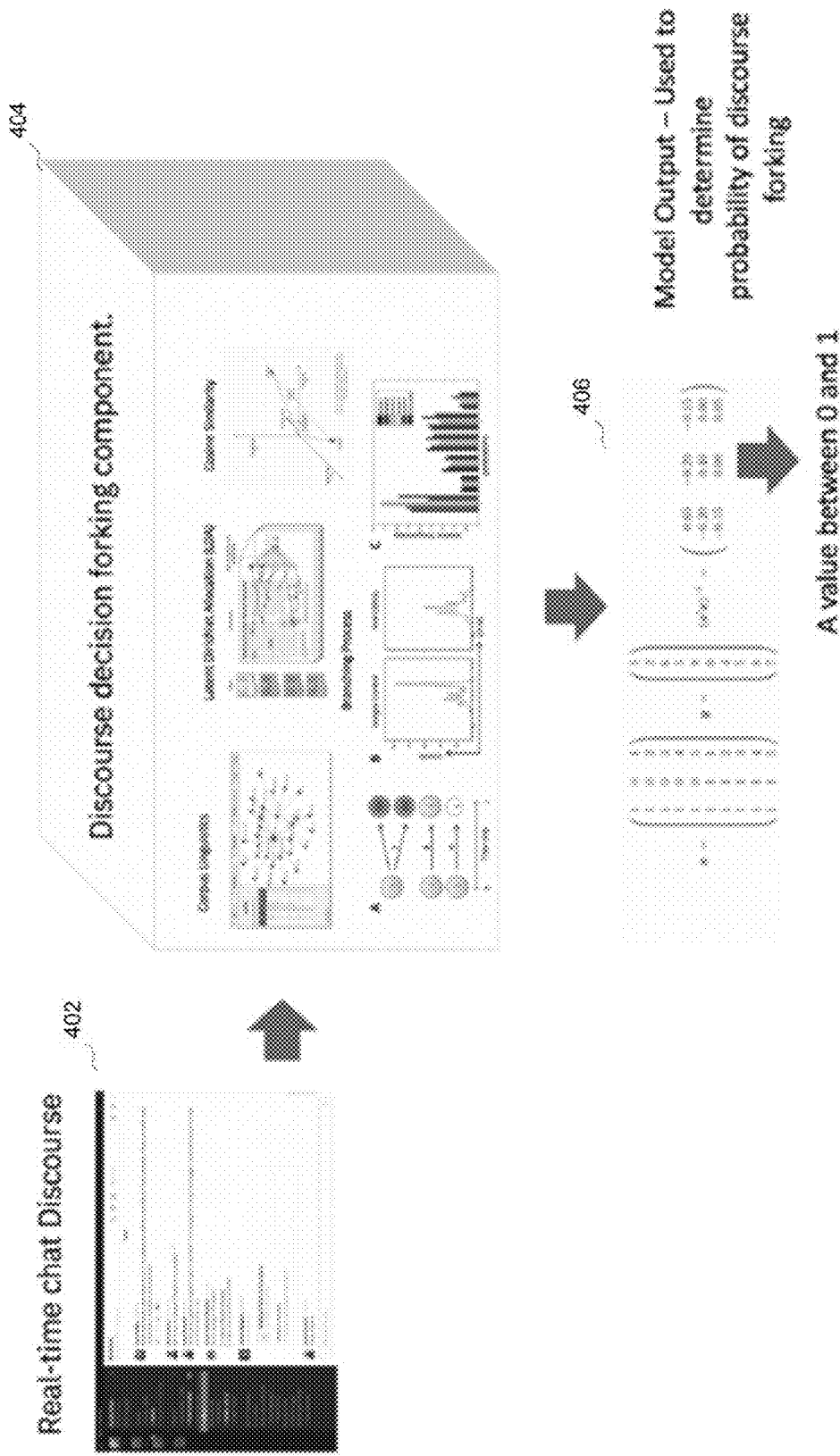
FIG. 4 is a diagram depicting a multi-vector DDFC analysis described in FIG. 2 to determine a probability of discourse forking according to at least one embodiment.

Next, at 204, the DDFC program 110A, 110B analyses the real-time chat discourse. According to an example embodiment, the DDFC program 110A, 110B may convert the chat into a text and analyze the converted chat discourse using topic analysis, corpus linguistics and cosine similarity techniques consecutively, as depicted in FIG. 4 and described below.

According to an example embodiment, topic analysis may be an integral or standalone software that is incorporated or controlled by the DDFC program 110A, 110B. Topic analysis is a machine learning and natural language processing technique, that may be a type of statistical model for discovering the abstract "topics" that occur in the received chat discourse. Topic analysis may be a text-mining tool for discovery of hidden semantic structures in a text of the chat discourse. The topic analysis is based on an approach that, given that a chat discourse is about a particular topic, it is expected that particular words may appear in the chat more or less frequently. For example, "dog" and "bone" will appear more often in documents about dogs, "cat" and "meow" will appear in documents about cats, and "the" and "is" will appear equally in both. The "topics" produced by topic analysis modeling techniques are clusters of similar words. A topic analysis may capture these "topics" in a mathematical framework, which allows examining a set of communications in a chat discourse, based on the statistics of the words in each communication in the chat discourse. For example, DDFC program 110A, 110B may apply a Latent Dirichlet Allocation (LDA) approach to determine the topics in the chat discourse.

After determining probable topics form the chat discourse, the DDFC program 110A, 110B may apply corpus linguistics techniques in order to determine relationships between the determined topics. According to an example embodiment, the DDFC program 110A, 110B may use the corpus linguistic to determine the probable relationships between the previously determined topics.

According to an example embodiment, a corpus linguistics analysis module may be an integral or standalone software that is incorporated or controlled by the DDFC program 110A, 110B. A corpus linguistics model is a software that may analyze the chat discourse in a digestive approach that derives a set of abstract rules that govern a natural language from the chat discourse, and explores how that language relates to the determined topics from the topic analysis. Typically, corpus linguistics models, apply machine learning techniques, such as trained neural networks, to convert each word or sentence of the chat discourse into a multi-dimensional vector. According to an example embodiment, DDFC program 110A, 110B may use the corpus linguistics analysis in order to transform each determined topic into a multi-dimensional vector for cosine similarity analysis.

According to an example embodiment, DDFC program 110A, 110B may apply cosine similarity analysis to a data derived from the corpus linguistics analysis such as a set of multi-dimensional vectors. The cosine similarity analysis software may be an integral or standalone software that is incorporated or controlled by the DDFC program 110A, 110B. Cosine similarity is a method to measure similarity between two non-zero vectors of an inner product space that measures the cosine of the angle between them. Two vectors with the same orientation have a cosine similarity of 1, two vectors oriented at 90° relative to each other have a similarity of 0, and two vectors diametrically opposed have a similarity of −1, independent of their magnitude. Applying cosine similarity method enables DDFC program 110A, 110B to determine whether the topics are related or not and measure the probability of their relations.

For example, DDFC program 110A, 110B may apply the IBM® Watson® (IBM, Watson, all IBM-based trademarks and logos, and all Watson-based trademarks and logos are trademarks or registered trademarks of International Business Machines Corporation and/or its affiliates) service components, which may use cognitive algorithms and techniques to perform topic analysis, corpus linguistics and cosine similarity analysis.

Figure 3:
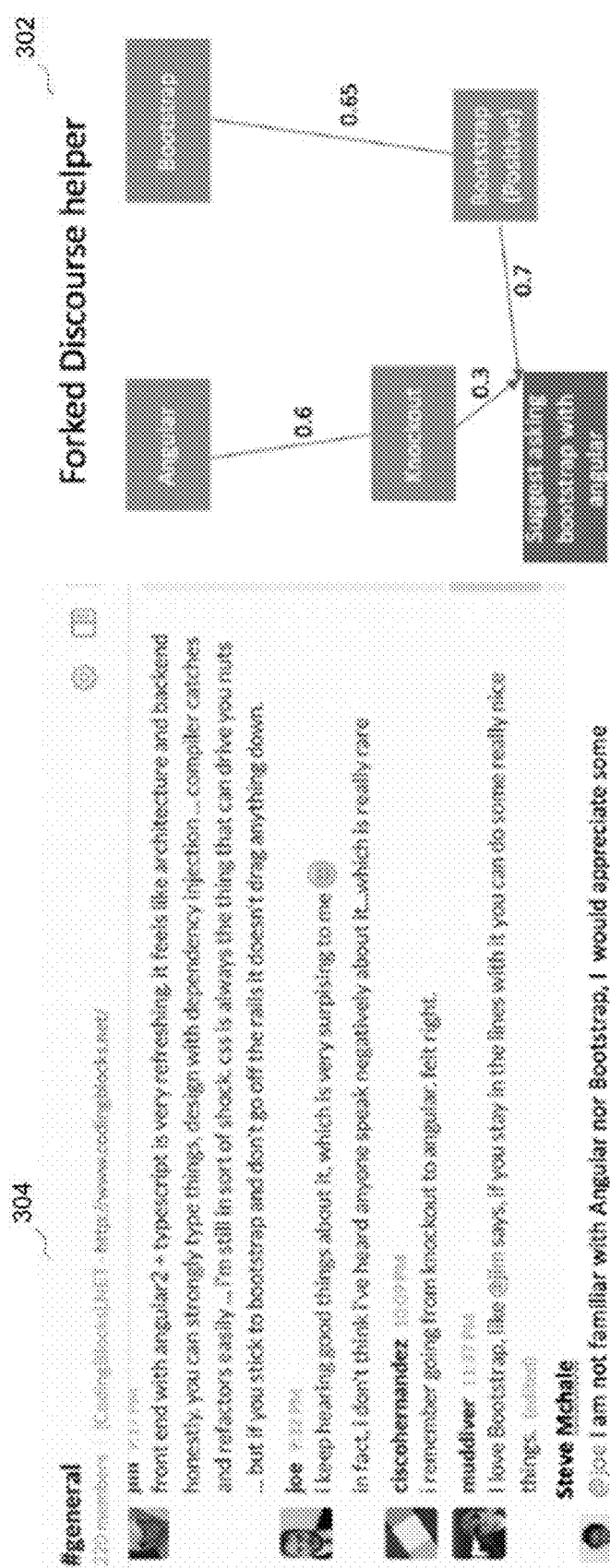
FIG. 3 is a forked discourse helper graphic user interface (GUI) component according to at least one embodiment.

Next, at 206, the DDFC program 110A, 110B derives a discourse decision forking component based on a similarity threshold value. According to an example embodiment, the DDFC program 110A, 110B may collect the determined data form the analysis and construct a topic tree where the related topics are branches of the tree as depicted in FIG. 3. According to an example embodiment, DDFC program 110A, 110B may compare the cosine similarity values between multi-dimension vectors and, based on a similarity threshold value that is determined by the user, establish whether the topics are related or not. In another embodiment, DDFC program 110A, 110B may extract the similarity threshold value from DDFC models 118 that are stored in server 112.

Then, at 208, the DDFC program 110A, 110B determines discourse forks using the DDFC. According to an example embodiment, the DDFC program 110A, 110B may determine the forking topics in a discourse based on comparing the cosine similarity values to the similarity threshold number. If the similarity threshold number is below the cosine similarity value of each 2 determined topics, DDFC program 110A, 110B may determine that the discourse forks and construct a topic tree based on the determination that the cosine similarity values are above the similarity threshold value, as depicted in FIG. 3.

Next, at 210, the DDFC program 110A, 110B provides a guide-rail discourse for multi-forked responses. According to an example embodiment, the DDFC program 110A, 110B may display using a graphical user interface (GUI) the determined topic tree coupled with the cosine similarity values or probability values to the user, as depicted in FIG. 3. According to an example embodiment, the DDFC program 110A, 110B may use an API service of the chat software to display forked discourse helper 302 window with a suggestion. In another embodiment, DDFC program 110A, 110B may automatically generate a message in the chat discourse based on the fork (branch of the generated tree) or make a decision based on a higher overall probability value of a branch of the generated tree. For example, if DDFC program 110A, 110B determines a fork where the new topic in the discourse is above a similarity threshold value, the DDFC program 110A, 110B may block the comment, suggest to write the comment in a different channel, or perform a predetermined action.

It may be appreciated that FIG. 2 provides only an illustration of one implementation and does not imply any limitations with regard to how different embodiments may be implemented. Many modifications to the depicted environments may be made based on design and implementation requirements. For example, the DDFC program 110A, 110B may apply different threshold values and different analyses based on determining the specific realm, that the topics of the conversation apply to, as depicted in FIG. 5.

FIG. 3 depicts a forked discourse helper graphic user interface (GUI) component. According to an example embodiment, the DDFC program 110A, 110B may incorporate a special forked discourse helper 302 GUI component into a chat application 304. According to an example embodiment, forked discourse helper 302 component may display a topic tree that was constructed from the chat topics with an appropriate cosine similarity values between the topics and an overall recommendation to a user based on comparing the values to a similarity threshold value set by a user or saved in a corresponding to a domain specific realm DDFC model 118. As an example, FIG. 3 depicts a screenshot where users discuss a particular topic Angular and Bootstrap. As discourse is continued, the DDFC program 110A, 110B models the key terms (topics) and determines the relevancy as part of an ongoing discussion. When the user considers to join the conversation, the DDFC program 110A, 110B provides a guide recommendation as to how to enter the conversation. Using the recommendation, the user may ask a question. As an option in an alternative embodiment, the DDFC program 110A, 110B may forward the discourse recommendation to a chat bot and have the bot ask the question on a user's behalf.

FIG. 4 depicts a diagram of a multi-vector DDFC analysis to determine a probability of discourse forking. According to a process depicted in FIG. 2, the DDFC program 110A, 110B may extract chat discourse from the chat application 402, analyze the extracted chat using topic analysis, corpus linguistics and cosine similarity as depicted in discourse decision forking component 404, and then determine the forking components by transforming the multi-dimensional vectors into a probability of discourse forking values 406.

Figure 5:
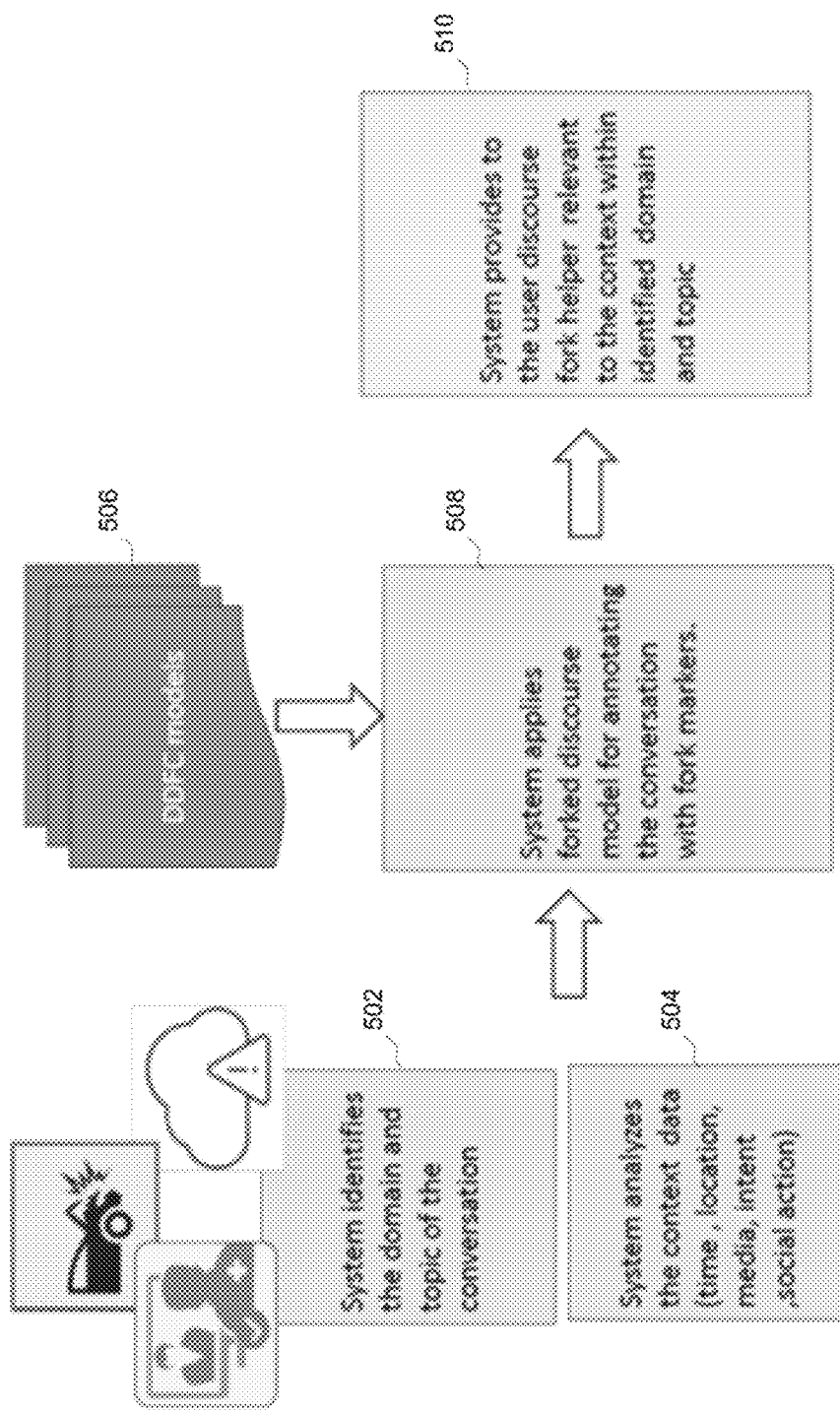
FIG. 5 is a diagram depicting a generalized diagram of DDFC process in a domain specific realm, according to at least one embodiment.

FIG. 5 depicts an application of a DDFC to a domain specific realm. According to a generalized embodiment, a system identifies the domain and topic of the conversation 502 using topic analysis and then matching the one or more topics to a domain. Then the system may analyze the context data 504 and using a corresponding to the domain DDFC model 506 determine a forked discourse model for annotating the conversation with forked markers 508. Then the system may provide the user with discourse fork helper relevant to the context within identified domain and topic 510.

Figure 6:
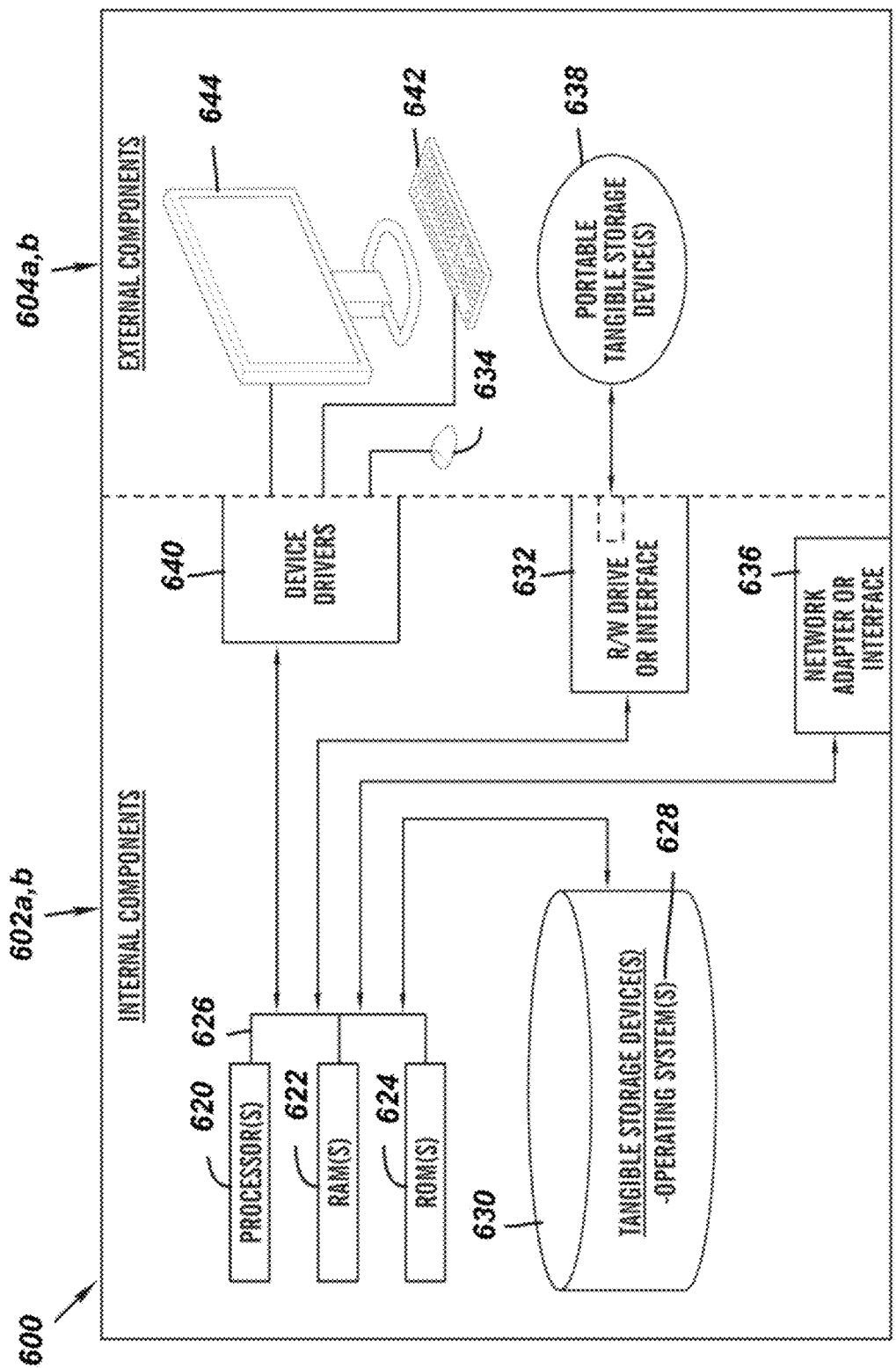
FIG. 6 is a block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602 a,b and external components 604 a,b illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the software program 108 and the * program 110A in the client computing device 102, and the * program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 638, read via the respective R/W drive or interface 632, and loaded into the respective hard drive 630.

Each set of internal components 602 a,b also includes network adapters or interfaces 636 such as a TCP/IP adapter cards, wireless Wi-Fi interface cards, or 3G or 4G wireless interface cards or other wired or wireless communication links. The software program 108 and the DDFC program 110A in the client computing device 102 and the DDFC program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the software program 108 and the DDFC program 110A in the client computing device 102 and the DDFC program 110B in the server 112 are loaded into the respective hard drive 630. The network may comprise copper wires, optical fibers, wireless transmission, routers, firewalls, switches, gateway computers and/or edge servers.

Each of the sets of external components 604 a,b can include a computer display monitor 644, a keyboard 642, and a computer mouse 634. External components 604 a,b can also include touch screens, virtual keyboards, touch pads, pointing devices, and other human interface devices. Each of the sets of internal components 602 a,b also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
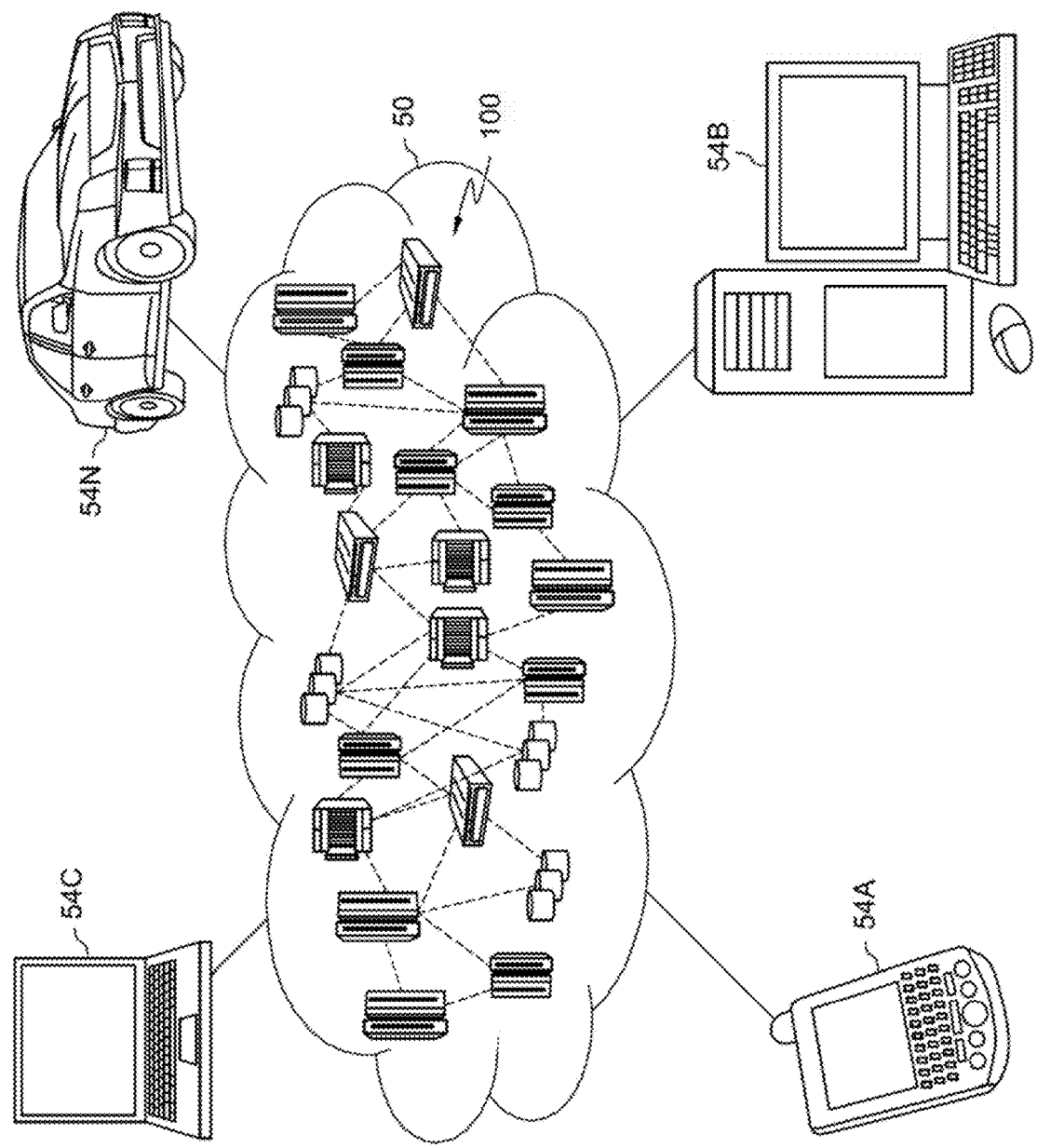
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
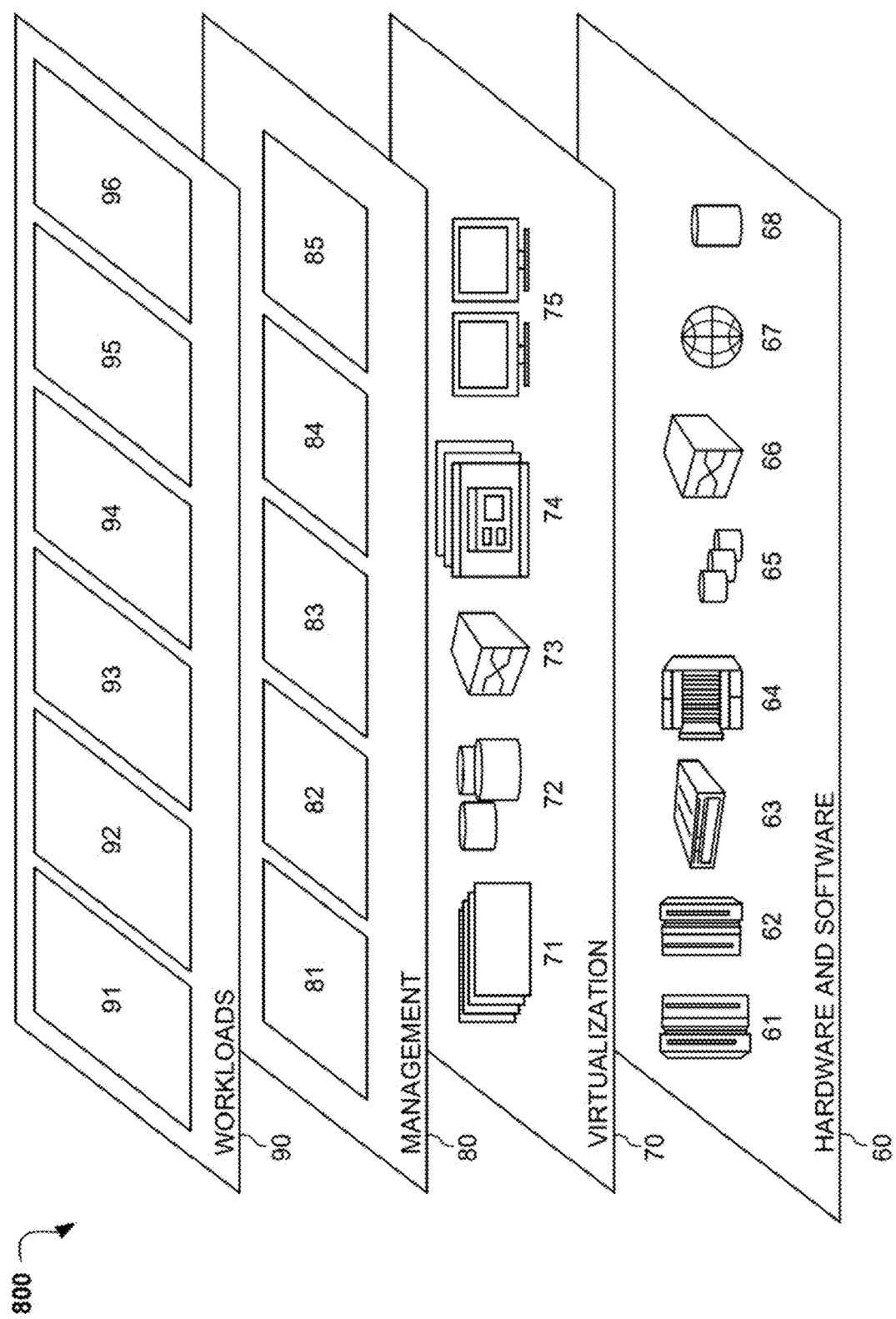
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and discourse decision forking 96. Discourse decision forking 96 may relate to analyzing real-time chat discourse, determining topics of the conversation and by applying topic analysis, corpus linguistics and cosine similarity determine discourse decision forking.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for a chat discourse decision forking, the method comprising:
   receiving a real-time chat discourse;
   analyzing the real-time chat discourse, wherein the real-time chat discourse is analyzed by consecutively applying a topic analysis technique to determine one or more topics in the real-time chat discourse, a corpus linguistics technique and a cosine similarity technique;
deriving a discourse decision forking component (DDFC) based on comparing the analyzed real-time chat discourse to a similarity threshold value; and
determining one or more discourse forks using the DDFC.

2. The method of claim 1, further comprising:
displaying the one or more determined discourse forks using a graphic user interface component as a topic tree wherein the topic tree comprises topics as branches of the topic tree, wherein the topics derived from the topic analysis technique and arranged based on the determined one or more discourse forks.

3. The method of claim 1, further comprising:
generating a message in the chat discourse based on the determined one or more discourse forks.

4. The method of claim 1, wherein the topic analysis technique is based on a Latent Dirichlet Allocation (LDA) approach.

5. The method of claim 1, wherein the corpus linguistic technique transfers the one or more topics into a set of multi-dimensional vectors.

6. The method of claim 5, wherein deriving the DDFC based on comparing the analyzed real-time chat discourse to the similarity threshold value comprises:
determining a similarity value between the set of multi-dimensional vectors; and
based on comparing the similarity value to the similarity threshold value, deriving the DDFC.

7. The method of claim 1, wherein the similarity threshold value is determined based on a domain, wherein the domain derived from the chat discourse.

8. A computer system for a chat discourse decision forking, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a real-time chat discourse;
analyzing the real-time chat discourse, wherein the real-time chat discourse is analyzed by consecutively applying a topic analysis technique to determine one or more topics in the real-time chat discourse, a corpus linguistics technique and a cosine similarity technique;
deriving a discourse decision forking component (DDFC) based on comparing the analyzed real-time chat discourse to a similarity threshold value; and
determining one or more discourse forks using the DDFC.

9. The computer system of claim 8, further comprising displaying the one or more determined discourse forks using a graphic user interface component as a topic tree wherein the topic tree comprises topics as branches of the topic tree, wherein the topics derived from the topic analysis technique and arranged based on the determined one or more discourse forks.

10. The computer system of claim 8, further comprising generating a message in the chat discourse based on the determined one or more discourse forks.

11. The computer system of claim 8, wherein the topic analysis technique is based on a Latent Dirichlet Allocation (LDA) approach.

12. The computer system of claim 8, wherein the corpus linguistic technique transfers the one or more topics into a set of multi-dimensional vectors.

13. The computer system of claim 12, wherein deriving the DDFC based on comparing the analyzed real-time chat discourse to the similarity threshold value comprises:
determining a similarity value between the set of multi-dimensional vectors; and
based on comparing the similarity value to the similarity threshold value deriving the DDFC.

14. The computer system of claim 8, wherein the similarity threshold value is determined based on a domain, wherein the domain derived from the chat discourse.

15. A computer program product for a chat discourse decision forking, the computer program product comprising:
one or more computer-readable tangible storage medium and program instructions stored on at least one of the one or more tangible storage medium, the program instructions executable by a processor, the program instructions comprising:
program instructions to receive a real-time chat discourse;
program instructions to analyze the real-time chat discourse, wherein the real-time chat discourse is analyzed by consecutively applying a topic analysis technique to determine one or more topics in the real-time chat discourse, a corpus linguistics technique and a cosine similarity technique;
program instructions to derive a discourse decision forking component (DDFC) based on comparing the analyzed real-time chat discourse to a similarity threshold value; and
program instructions to determine one or more discourse forks using the DDFC.

16. The computer program product of claim 15, further comprising program instructions to display the one or more determined discourse forks using a graphic user interface component as a topic tree wherein the topic tree comprises topics as branches of the topic tree, wherein the topics derived from the topic analysis technique and arranged based on the determined one or more discourse forks.

17. The computer program product of claim 15, further comprising program instructions to generate a message in the chat discourse based on the determined one or more discourse forks.

18. The computer program product of claim 15, wherein the topic analysis technique is based on a Latent Dirichlet Allocation (LDA) approach.

19. The computer program product of claim 15, wherein the corpus linguistic technique transfers the one or more topics into a set of multi-dimensional vectors.

20. The computer program product of claim 19, wherein program instructions to derive the DDFC based on program instructions to compare the analyzed real-time chat discourse to the similarity threshold value comprises:
program instructions to determine a similarity value between the set of multi-dimensional vectors; and
based on comparing the similarity value to the similarity threshold value program instructions to derive the DDFC.

* * * * *